Figure 1:
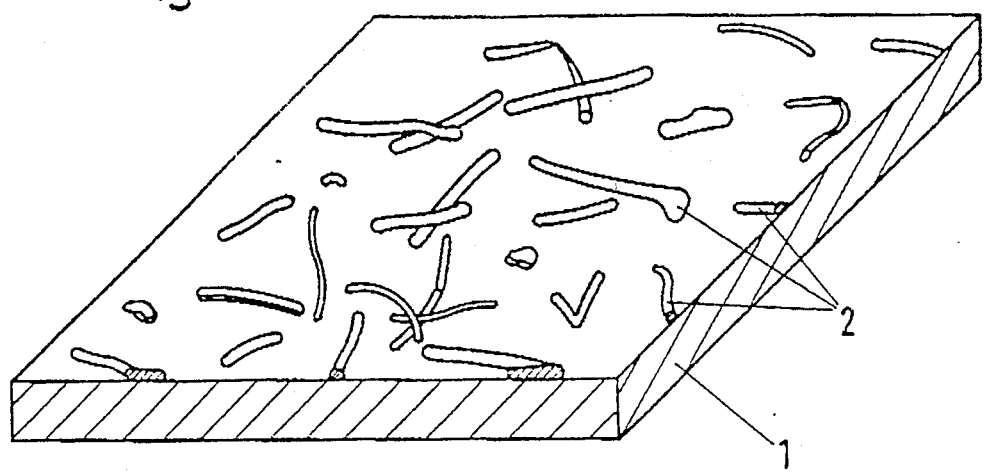

United States Patent [19]

Brandt

[11] Patent Number: 4,885,201
[45] Date of Patent: Dec. 5, 1989

[54] FILM MADE FROM A WELDABLE POLYMER MATERIAL WITH PROJECTIONS

[75] Inventor: Michael Brandt, Seevetal, Fed. Rep. of Germany

[73] Assignee: SLT North America Inc., Conroe, Tex.

[21] Appl. No.: 258,096

[22] Filed: Oct. 14, 1988

Related U.S. Application Data

[63] Continuation of Ser. No. 68,657, Jul. 1, 1987, abandoned.

[30] Foreign Application Priority Data

Jul. 4, 1986 [DE] Fed. Rep. of Germany ....... 3622559

[51] Int. Cl.[4] ............................................. B32B 27/40
[52] U.S. Cl. .................................... 428/143; 428/141; 428/147; 428/206; 428/402; 428/327; 428/179
[58] Field of Search ............... 428/141, 143, 179, 147, 428/206, 327, 402

[56] References Cited

U.S. PATENT DOCUMENTS

| | | | |
|---|---|---|---|
| 2,793,136 | 5/1957 | Root | 428/327 |
| 4,239,797 | 12/1980 | Sachs | 428/327 |
| 4,488,918 | 12/1984 | Jofs | 428/141 |
| 4,501,783 | 2/1985 | Hiragami et al. | 428/147 |
| 4,543,106 | 9/1985 | Parekh | 428/143 |
| 4,608,287 | 8/1986 | Biotteau | 428/327 |

Primary Examiner—Ellis P. Robinson
Assistant Examiner—Archene A. Turner
Attorney, Agent, or Firm—Cumpston & Shaw

[57] ABSTRACT

A film made from a weldable polymer material with projections. The projections are formed by particles which are applied, in particular sprayed, in the molten state onto the film surface. The welding factor is preferably significantly below 1.

11 Claims, 1 Drawing Sheet

FILM MADE FROM A WELDABLE POLYMER MATERIAL WITH PROJECTIONS

This is a continuation of co-pending application Ser. No. 068,657 filed on July 1, 1987 now abandoned.

DESCRIPTION

The invention relates to a process for providing the surface of a film made from a weldable polymer material with projections, and a film furnished by this process.

As used herein A weldable polymer material means one which can be bonded by welding or processes similar to welding to parts made from the same or another material if at least one of the two parts is at elevated temperature. In general, this means a thermoplastic material.

Apart from thin membranes, the term film also covers thicker, sheet-like objects up to a thickness of several millimeters.

Films are frequently employed for separating solid regions, in particular in excavation work, hydraulic engineering and civil engineering. In such applications It may be disadvantageous that the film interrupts the frictional contact between these regions. It is known to counteract this disadvantage by providing one or both surfaces of the film with a large number of projections or recesses by emboss molding of the film. This has the disadvantage that the film structure is damaged. In addition, the known process is expensive.

It is an object of this invention to reduce the expense for the production of film roughness and to avoid damage to the film material.

One embodiment of the invention comprises applying to the surface particles of a material which can be welded to the film surface while the film surface and/or the particles are at the welding temperature.

The particles, in the molten state, are advantageously thrown against the film surface. As used herein, this means free flight or fall of the particles with a speed such that the kinetic energy of the particles is sufficient to press them against the film surface on impact and, at the same time, to deform them in order to create adequate surface contact.

The molten composition used for formation of the particles is for example sprayed against the film.

According to a particular feature of the invention, the surface temperature of the film on impact of the particles should be less than about 70° C. This figure applies to polyethylene. In the case of materials having a higher or lower melting point, the limit is correspondingly higher or lower. It is preferably even below 50° C. this causes the thermal loading of the film through welding to be low since it is the particles which provide the necessary heat of melting due to the relatively high inherent temperature. Additionally it causes welding of the film to the particles to occur to an only incomplete extent, ie. with a welding factor significantly below 1. As used herein, welding factor means the ratio of the strength of the welded joint to the strength of the material, expressed as a fraction or as a percentage. Whereas, in general in weldings, a welding factor of as close to 1 as possible is desired, ie. a welding zone strength which is similar to the strength of the base material, a limited, lower weld quality is desirable in in accordance with invention so that only a limited force can be exerted on the film during lateral shear stress of the particles welded to the film. If this force threshold is reached, the particle detaches from the film surface without damaging the film.

A film according to the invention is correspondingly distinguished by the fact that the projections arranged on its surface are welded to the film surface with a welding factor which is significantly below 1. This factor is advantageously below 0.9, further expediently below 0.7, further expediently below 0.5 and further expediently about 0.3.

Preferably the projections have an irregular shape and arrangement as arises during chance shaping on leaving a spray nozzle. In particular, they are oblong shaped having a length/thickness ratio which is, on average, above 4. However, the projections can also have a smaller length/thickness ratio, but this should be at least 1. In particular, the projections may be round. The height of the projections that is the distance the projection protrudes over the film surface is matched to the structure of the solid with which they are to interact. If this solid is a very coarsely grained fill material, the projections may also be made relatively coarse. If, in contrast, the solid is a fine-grained substance, for example sandy or loamy soil, small projections suffice. It has proven very expedient for them to have an average height of less than about 2 mm.

In certain applications it is sufficient to provide only one of the two film surfaces with roughness projections. In general, such a provision is preferred on both film surfaces.

Figure 2:
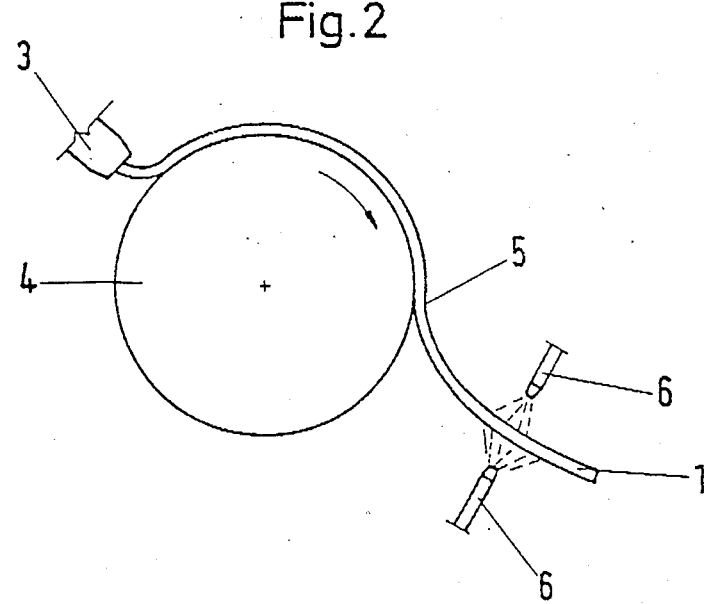

The invention is described below in greater detail with reference to the drawing, in which:

FIG. 1 shows an illustration, enlarged to a scale of about 5:1, of a film section, and FIG. 2 shows a device for carrying out the process.

FIG. 1 shows a detail from a film (1) as is known in the prior art for earth-sealing sheeting, for example for dump-sealing sheeting or dike-sealing sheeting. It can comprise, for example, polyethylene or comparable materials. Its thickness is, for example, of the order of 2 mm, although the invention can also be used in films of significantly lesser or greater thickness.

On its upper side can be seen the particles (2) which are welded to its surface and which, it is assumed in the case shown, have been applied by a spraying process and have received an oblong, irregular shape during spraying. They are preferably elongated, and lie on the film surface in their longitudinal direction, and their height above the surface, which is equal to their thickness, is preferably between 0.1 and 1 times the film thickness. However, they may, in the context of the invention, have another shape, for example a shape with a length/thickness ratio nearer 1.

FIG. 2 shows the production process in a schematic side view of a production apparatus. The film is produced by extruding the film material from the extruder nozzle (3) onto the surface of the cooling drum (4). After adequate cooling and solidification, the film is removed from the drum at (5) and fed to a winding or further processing device, not shown. At a small distance from the drum (4) are located upper and lower spray nozzles (6), from which the material forming the projections (2) is sprayed onto the film surface. The nozzles may be designed according to the relevant prior art with respect to their shape, the material pressure to be used taking into account the viscosity of the material and with respect to the possible use of additional compressed gas so that the particles emerging from the spray nozzle have the desired shape and speed. The position of the nozzles (6) is selected so that the surface of the film (1) at the spraing point has the temperature suitable for achieving the desired welding factor. For regulation, the nozzles can either be designed to be movable, so that, if desired, they can be employed closer to the drum (relatively high temperature) or further from it (relatively low temperature). Additional warming or cooling means for the film surface may also be provided.

Figure 3:
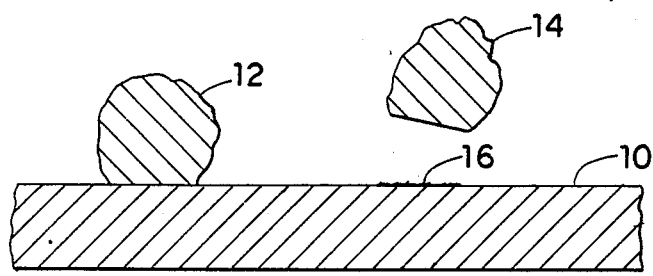

FIG. 3 shows a section view of a film 10 having projections 12 and 14 thereon in accordance with the teaching of this invention. Particle 12 is adhered to the surface of film 10 by a weld having a weld factor less than 1. Particle 14 is shown detached from the surface of film 10 for example by locally high stress. Film 10 is not damaged by the detachment of projection 14 which at most leaves a slightly roughened surface area 16 where the base of projection 14 was previously attached.

I claim:

1. An increased friction, damage resistant film comprising a film substrate having at least one film surface; a plurality of friction-increasing projections attached to said film surface by a plurality of welds characterized by a welding factor of significantly below 1.

2. A film as claimed in claim 1, wherein the projections can be detached from the film surface by means of a force directed parallel to the film surface without significant damage to the film surface.

3. A film as claimed in claim 1 or 2, wherein the projections (2) have an irregular shape and distribution.

4. A film as claimed in claim 3, wherein the projections (2) have an average height above the film surface of less than about 2 mm.

5. A film as claimed in any of claims 1 to 4, comprising a second film surface and a plurality of projections attached to said second film surface by a plurality of welds characterized by a welding factor of significantly below 1.

6. A film as claimed in claim 1, wherein the projections are oblong and are bonded recumbently on the film surface.

7. A film as claimed in claim 6, wherein the length/thickness ratio of the projections (2) is at least 1.

8. A film as claimed in claim 1, wherein the projections are round.

9. A film as claimed in claim 8, wherein the length/thickness ratio of the projections (2) is at least 1.

10. A film as claimed in claim 1, wherein the projections (2) have an irregular shape and distribution.

11. A film as claimed in claim 10, wherein the projections (2) have an average height above the film surface of less than about 2 mm.

* * * * *